United States Patent
Schilling et al.

[11] Patent Number: 5,427,362
[45] Date of Patent: Jun. 27, 1995

[54] ACTIVE VIBRATION DAMPER

[75] Inventors: Hermann Schilling, Weinheim; Ulrich Freudenberg, Sinsheim, both of Germany; Markus Leibach, Ann Arbor, Mich.

[73] Assignee: Firma Carl Freudenberg, Weinheim, Germany

[21] Appl. No.: 185,737

[22] Filed: Jan. 24, 1994

[30] Foreign Application Priority Data

Jan. 23, 1993 [DE] Germany .................. 43 01 845.9

[51] Int. Cl.⁶ ............................................. F16F 15/03
[52] U.S. Cl. ................... 267/140.14; 188/379; 188/267
[58] Field of Search .......... 267/140.11, 140.13, 267/140.14, 140.15, 195, 136, 279; 188/378, 379, 380, 161, 163, 267; 248/550, 636, 638, 559; 180/300, 312

[56] References Cited

U.S. PATENT DOCUMENTS

| | | | |
|---|---|---|---|
| 4,432,441 | 2/1984 | Kurokawa | 188/379 X |
| 4,650,170 | 3/1987 | Fukushima | 188/378 X |
| 5,236,186 | 8/1993 | Weltin et al. | 267/140.15 |
| 5,344,129 | 9/1994 | Ide et al. | 267/140.14 |

Primary Examiner—Robert J. Oberleitner
Assistant Examiner—Peter M. Poon
Attorney, Agent, or Firm—Kenyon & Kenyon

[57] ABSTRACT

An active vibration damper for a reciprocating machine part, comprising an inertial mass that can be displaced in the direction of the reciprocating motion and a support plate that can be fastened to the machine part. The inertial mass and the support plate are connected to one another by a spring element. The natural frequency of the vibrating system constituted by the inertial mass and the spring element is at most as great as the frequency of the reciprocating motion. The inertial mass can be moved by plunger coil fastened to the support plate so as to be immobile with respect thereto, and the spring element can be deformed by the plunger coil. The inertial mass consists of a cup-shaped magnet that at least partly concentrically surrounds the plunger coil radially on the inside and outside. The cup-shaped magnet is guided by a guideway parallel to the axis of the plunger coil.

17 Claims, 3 Drawing Sheets

ACTIVE VIBRATION DAMPER

BACKGROUND OF THE INVENTION

The invention relates to an active vibration damper for a reciprocating machine part. The active vibration damper comprises an inertial mass that can be displaced in the direction of the reciprocating motion and a support plate that can be fastened to the machine part, a spring element being interposed between the inertial mass and the support plate.

A vibration damper of this kind is known from U.S. Pat. No. 5,236,186, the disclosure of which is incorporated herein by reference. The vibration damper is associated with a vibrating body made of magnetizable material that magnetically attracts a magnet, by which attraction the inertial mass can be set in motion. The magnet and the vibrating body can move relative to one another in any operating state. The magnet, which forms at least one part of the damping mass, and the vibrating body are separated by a gap that extends substantially transverse to the direction of the introduced vibrations. A spring element is interposed between the magnet and vibrating body. The configuration of this vibration damper is particularly advantageous in terms of cost and manufacturability; it is worth noting, however, that during its intended use, the gap between the return plate and the magnet continually changes, therefore causing nonlinear properties of the damper that are difficult to predict.

SUMMARY OF THE INVENTION

An object of the invention is to develop further a vibration damper of the type described above, in such a way that it has largely linear operating characteristics and a simple configuration.

The vibration damper according to the invention has a natural frequency of the vibrating system, constituted by an inertial mass and a spring element, no greater than the frequency of the reciprocating motion. The inertial mass is movable by means of a plunger coil which is fastened to a support plate so as to be immobile with respect thereto. The inertial mass comprises a cup-shaped magnet that at least partly concentrically surrounds the plunger coil radially on the inside and outside, and the cup-shaped magnet is guided in its reciprocating motion by a guideway parallel to the axis of the plunger coil. The spring element, interposed between the inertial mass and the support plate, is deformable by action of the plunger coil on the magnet.

Because of the parallel guidance of the parts moving with respect to one another, the magnet gap can be configured to extend substantially parallel to the direction of motion, so that a uniformly consistent gap width may be maintained. This constant gap width results in the vibration damper having linear operating characteristics.

The magnetic field extends radially in the air gap between the plunger coil and the cup-shaped magnet and thus generates no static preload on the spring element along the intended direction of motion. Because the spring element is not statically loaded by the static magnetic force, there is no permanent compression of the spring material even after extended use.

The vibration damper allows active reduction of the introduced vibrations. The vibration damper can be deliberately activated to vibrate in order to modify the frequency and amplitude of vibrations in the adjacent machine component in a desirable manner.

The cup-shaped magnet, which consists of a magnet housing and a magnet, constitutes an inertial mass that can move parallel to the axis of the plunger coil. When an alternating current is introduced into the plunger coil, a force is generated between the cup-shaped magnet and the support plate fastened to the machine part. The plate presses on the one hand against the inert mass of the cup-shaped magnet and on the other hand against the vibrating component. With this configuration utilizing the support plate, it is of significant importance that the plunger coil does not need to be fastened to the vibrating component by means of a separately applied mount.

To achieve good characteristics over a long service life and to make the active, triggerable vibration damper useful in a variety of installation positions, an elastic suspension system in the form of the spring element is provided between the cup-shaped magnet and the support plate (which supports the plunger coil). This suspension system retains the cup-shaped magnet in a defined spatial neutral position. A guideway guides the cup-shaped magnet with respect to the plunger coil so that, even when transverse forces act on the cup-shaped magnet, no impermissible friction or force effects occur between the magnet and the coil.

According to an advantageous embodiment, the spring element can be made of an elastomeric material. In this configuration, the vibration damper is uncomplicated and has few parts. The spring stiffness of the spring element can be chosen by selecting an appropriate material based on the inertial mass of the cup-shaped magnet and the vibration being canceled. Preferably the spring element has a dissipation factor of 0.03 to 0.2. The dissipation factor is the ratio between the dissipation modulus and the storage modulus of the elastomeric material being used.

According to another embodiment, the spring element may consist of an air cushion that is bounded by the support plate and the cup-shaped magnet. It is advantageous in this embodiment that the dissipation of elasticity can be largely prevented with sealing of the parts which move with respect to one another. It must be noted, however, that sealing of the air cushion with respect to the environment requires additional seals.

The cup-shaped magnet can consist of a magnet and a magnet housing, the magnet being fastened in the magnet housing so as to be immobile with respect thereto. The magnet housing and the magnet are configured as a preassembled unit, greatly simplifying assembly of the vibration damper. The vibration damper is then made up essentially of only two parts, consisting of the cup-shaped magnet and the support plate to which the plunger coil is fastened.

According to a first embodiment, the magnet can be configured as a permanently magnetized annular magnet, and can be magnetized in the radial direction. The permanent magnet and the plunger coil are arranged in this embodiment so as to move with respect to one another. During intended use, the permanent magnet generates a magnetic flux which extends radially beyond the air gap. By means of the plunger coil, a variable flux is superimposed on the static flux, so that an alternating force component results in the air gap which extends parallel to the direction of motion of the vibrations introduced. This force presses on the one hand against the inertial mass and on the other hand against the machine part being damped. The alternating current required for this purpose is delivered to the plunger coil from a power supply unit that can be controlled in accordance with the vibrations being damped, for example with the aid of sensors.

According to another embodiment, the magnet can consist of a permanent magnet magnetized in the axial direction. The magnet is at least partly surrounded by the magnet housing forming an air gap; the magnet housing consisting of two magnet elements that are associated with the permanent magnet adjacently on either side in the direction of motion. The magnet elements can each be connected in an elastically flexible manner, by means 8 a spring element made of a metallic material, to a cylindrical projection of the support plate extending axially. The projection can be configured as a guide sleeve, and the magnet elements can be guided so as to move relative to the guide sleeve. This kind of configuration has the advantage that disk-shaped permanent magnets, which can be produced particularly economically, can be used. The guide sleeve projection can, for example, be designed as several hollow cylindrical annular elements which are adjacent to one another in the axial direction, so that they can be clamped together with the spring elements interposed. The utilization of two spring elements between the cup-shaped magnet and the guide sleeve has the advantage that any radial loads which may occur as a result of operation are intercepted by the spring elements. The metal spring elements can, for example, consist of metal membranes that allow particularly good, friction-free radial bracing and axial guiding. This eliminates the need for a sliding guideway between the cup-shaped magnet and guide sleeve.

According to another embodiment, the magnet can be configured as an electromagnet. By means of a direct current, the electromagnet generates a constant magnetic field in the annular gap of the electromagnet. By varying the direct current, the dynamic alternating force generated by the alternating current flowing in the plunger coil can be varied, and the level of vibration of the machine part can be adjusted. With this kind of configuration, the vibration damper can be matched extraordinarily well to the particular circumstances of an application.

The cup-shaped magnet can be annular and enclosed. With this configuration it can be produced at comparatively lower cost.

According to another embodiment, the cup-shaped magnet can consist of segments distributed circumferentially. The segmented magnet allows a great deal of freedom in designing the damper. This has particular advantages for specific applications, since for example the guide pins or the guideway can be positioned between the magnet segments.

With respect to the best possible response characteristics of the vibration damper when the plunger coil is acted upon by current, the guideway is preferably arranged so as not to move with respect to the support plate, such that the guideway makes contact with the magnet housing via sliding surfaces. The sliding surfaces can consist, for example of a coating made of a low-friction material, for example PTFE. This allows the cup-shaped magnet to move easily. This embodiment is advantageous when reversing direction and in the transition from non-sliding to sliding behavior.

Easy motion of the vibration damper can be further promoted by the fact that the guideway consists of at least two guide pins regularly distributed circumferentially, which are surrounded by hollow cylindrical recesses of the magnet housing that extend parallel to the axis of the plunger coil. The guide pins can, for example, be provided with lubricant pockets in the vicinity of their surface, or they can be made of a self-lubricating polymer material. With their comparatively long extension in the direction of the introduced vibrations, the guide pins reliably prevent jamming of the two parts that move with respect to one another.

At least one of the parts constituting the guideway can be provided with a friction-reducing surface coating.

According to another embodiment, the spring element can be configured as a guidance and damping bushing, and can be arranged in the radial direction between the magnet housing and an axially extending hollow cylindrical projection of the support plate. With such an embodiment, the spring element provides damping of the resonant vibrations of the vibration damper, and prevents collisions between the support plate and the cup-shaped magnet when high-amplitude vibrations are introduced. This embodiment is also advantageous when sudden loads are superimposed on the vibrations that result from operation.

The subject matter of the present invention is elucidated in greater detail below with reference to the drawings.

DETAILED DESCRIPTION OF THE DRAWINGS

Figure 1:
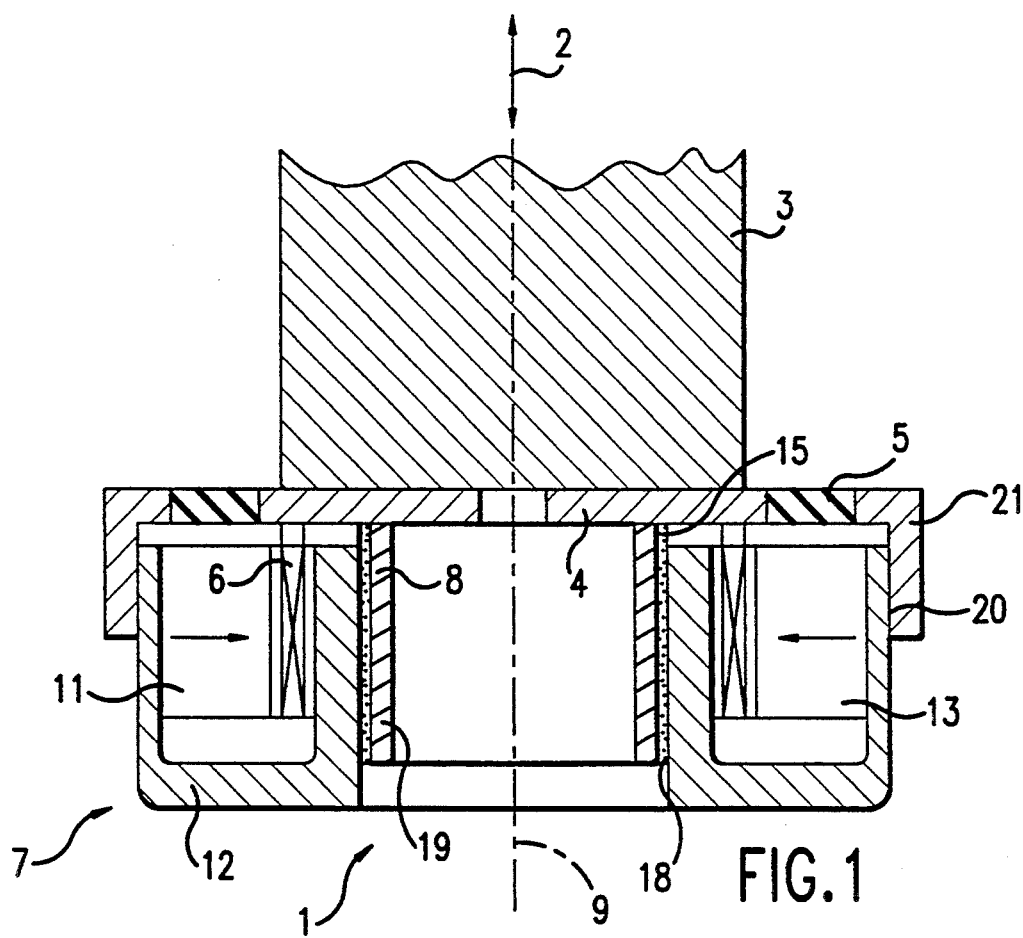
FIG. 1 shows a first exemplary embodiment of the vibration damper according to the invention, wherein the magnet of the cup-shaped magnet is configured as a permanent magnet.

FIGS. 1 to 5 each show an active vibration damper 1 that is fastened to a machine part 3 that can move back and forth. The vibration damper 1 comprises a support plate 4 that is attached to machine part 3. In the exemplary embodiments depicted here, machine part 3 and support plate 4 are bolted together. The inertial mass of the vibration damper consists of a cup-shaped magnet 7, cup-shaped magnet 7 comprising a magnet 11 and a magnet housing 12. The inertial mass can be varied by changing the mass of magnet housing 12. In this manner, and by means of spring elements 5 which are also designed to be variable, the natural frequency of vibration damper 1 can be set to a desired value. Cup-shaped magnet 7 radially surrounds a plunger coil 6 internally and externally, plunger coil 6 being fastened to support plate 4 so as to be immobile with respect thereto. Plunger coil 6 is provided with a connector (not depicted here), and can be provided with alternating current by a power supply unit. Plunger coil 6 is arranged parallel to motion 2 of machine part 3, cup-shaped magnet 7 being fastened by a spring element 5 to support plate 4 so as to allow vibration.

By activating plunger coil 6, the vibrations introduced into machine part 3 can be reduced, or can be canceled by introducing a countervibration. An alternating current is introduced into plunger coil 6 as a function of the vibration of machine part 3, so that a force results between cup-shaped magnet 7 and support plate 4 and presses axially against the mutually adjacent parts that are suspended with respect to one another so as to allow vibration.

In FIG. 1, cup-shaped magnet 7 consists of magnet housing 12 and a magnet 11, which is configured as a ring magnet 13 magnetized in the radial direction, as indicated by the arrows. Magnet housing 12 is connected in the region of its outer periphery by means of a press fit 20 to edge region 21 of support plate 4. The support plate 4 and the edge region 21 are connected to one another by a spring element 5 made of elastomeric material.

Cup-shaped magnet 7 is guided in the region of its inner periphery by means of an axial projection 19 that is tubular in shape and fastened to support plate 4 so as to be immobile with respect thereto. Projection 19 is provided in the region of its outer circumference with a friction-reducing surface coating 18 in order to improve the response characteristics of vibration damper 1 when alternating currents are introduced. The cup-shaped magnet 7 is guided by a guideway 8 parallel to the axis 9 of the plunger coil 6.

Figure 2:
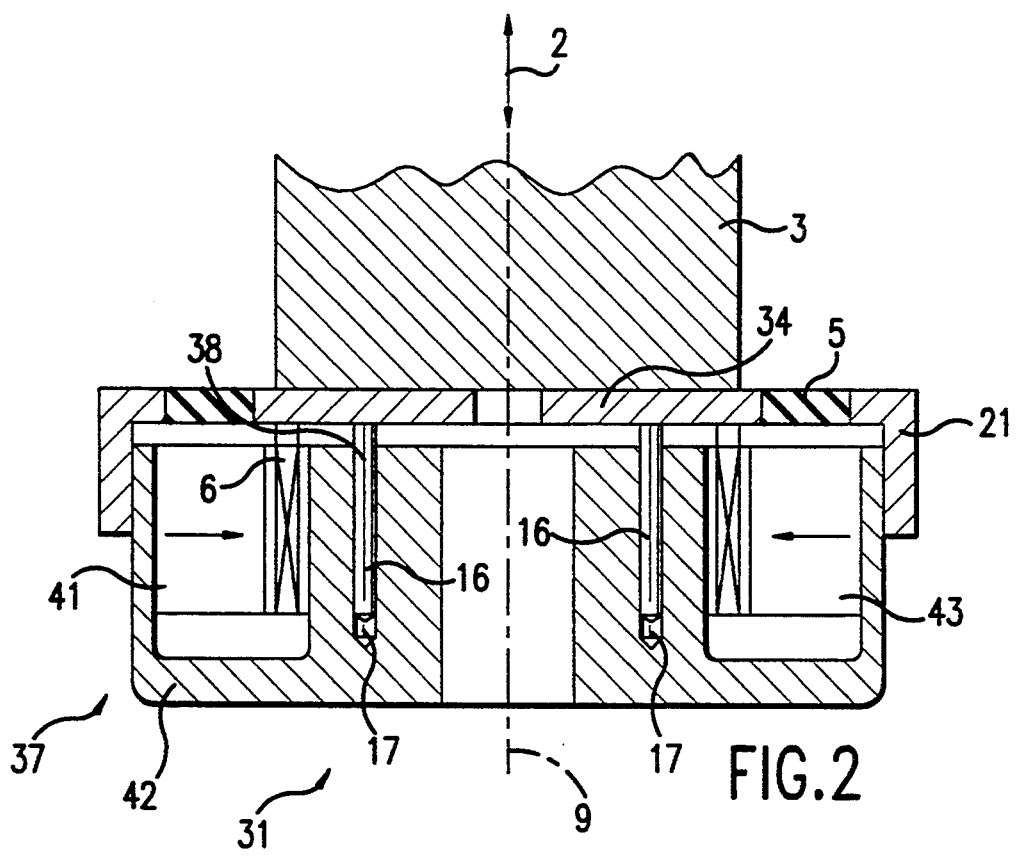
FIG. 2 shows a second exemplary embodiment in which the guideway consists of guide pins that are attached to the support plate.

FIG. 2 shows an exemplary embodiment of a vibration damper 31 in which guideway 38 consists of guide pins 16 regularly distributed circumferentially. The guide pins 16 are attached to support plate 34 and are guided in recesses 17 of magnet housing 42. In this exemplary embodiment, the guide pins 16 can be made of a suitable alloy so that no secondary lubricant is needed to reduce friction when relative motions occur between cup-shaped magnet 37 and machine part 3. Also in this exemplary embodiment, magnet 41 consists of a radially magnetized annular magnet 43. The exemplary embodiment depicted here does not differ in terms of operation from the exemplary embodiment of FIG. 1.

Figure 3:
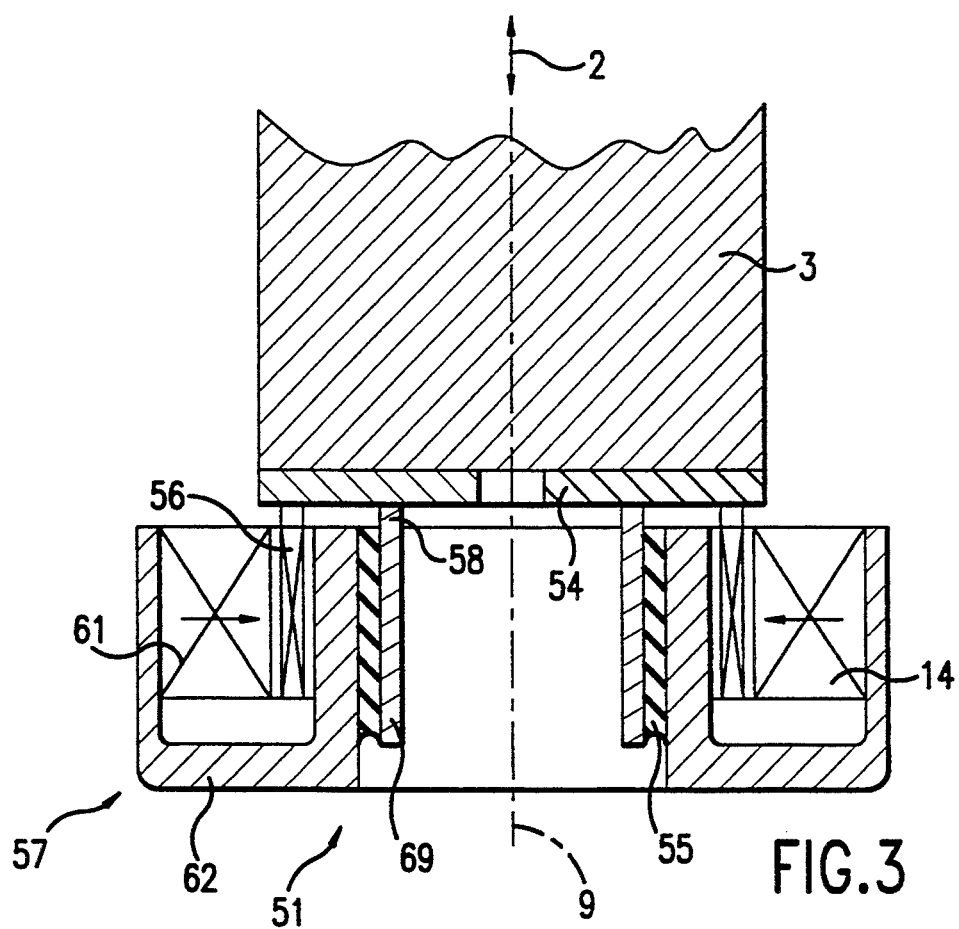
FIG. 3 shows a third exemplary embodiment, wherein the spring element extends in the direction of the introduced vibrations and is configured as a damping bushing.

FIG. 3 shows an exemplary embodiment of vibration damper 51 according to the invention in which spring element 55 is made of elastomeric material and is arranged in the region of the outer circumference of a projection 69 which forms guideway 58. On the outside in the radial direction, spring element 55 is surrounded peripherally by magnet housing 62 of cup-shaped magnet 57, spring element 55 being arranged adhesively or by frictional engagement inside the gap between projection 69 and magnet housing 62. A spring element 55 arranged in this manner provides not only elastic bracing of cup-shaped magnet 57 with respect to support plate 54, but also damping of the relative movements between magnet 61 and plunger coil 56. As a result, impermissible excessive resonance does not occur when passing through resonance regions. This reliably prevents magnet housing 62 from striking adjacent support plate 54 in the axial direction.

In this exemplary embodiment magnet 61 is configured as an electromagnet 14 and surrounds plunger coil 56 around its outer periphery. Electromagnet 14, like plunger coil 56, is activated by a power supply unit (not depicted here). The comparatively simpler and more cost-effective configuration of a vibration damper with a permanent magnet according to FIGS. 1 and 2 is offset, when an electromagnet is used, by improved adaptation of the counterforce generated by vibration damper 51 to the particular vibrations of machine part 3 that require damping.

Figure 4:
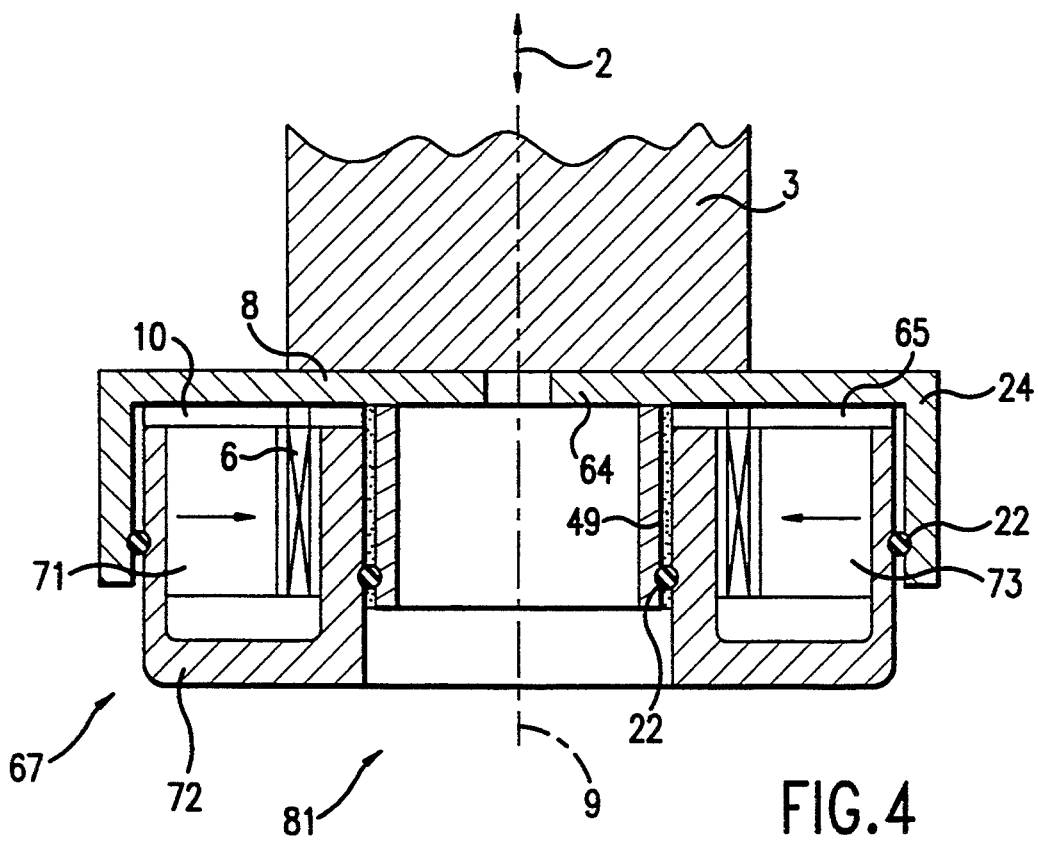
FIG. 4 shows a fourth exemplary embodiment in which the spring element consists of an air cushion.

FIG. 4 shows a fourth exemplary embodiment of vibration damper 81 according to the invention, wherein spring element 65 is configured as an air cushion 10. Maintaining air cushion 10, and preventing the penetration of dust or moisture, requires seals which seal support plate 64 at its edge region 24 and projection 49 with respect to cup-shaped magnet 67, which moves with respect thereto. Again, in this embodiment, cup-shaped magnet 67 consists of a magnet 71, in the form of a radially magnetized permanent magnet 73, and magnet housing 72.

In this exemplary embodiment the seals are depicted schematically and consist of two O-ring seals 22. They are arranged in a seal groove on the outer circumference of projection 49 and in axial edge region 24. The adjacent surfaces of magnet housing 72 are finished so that O-ring seals 22 are subjected to the least possible wear when used as intended.

Figure 5:
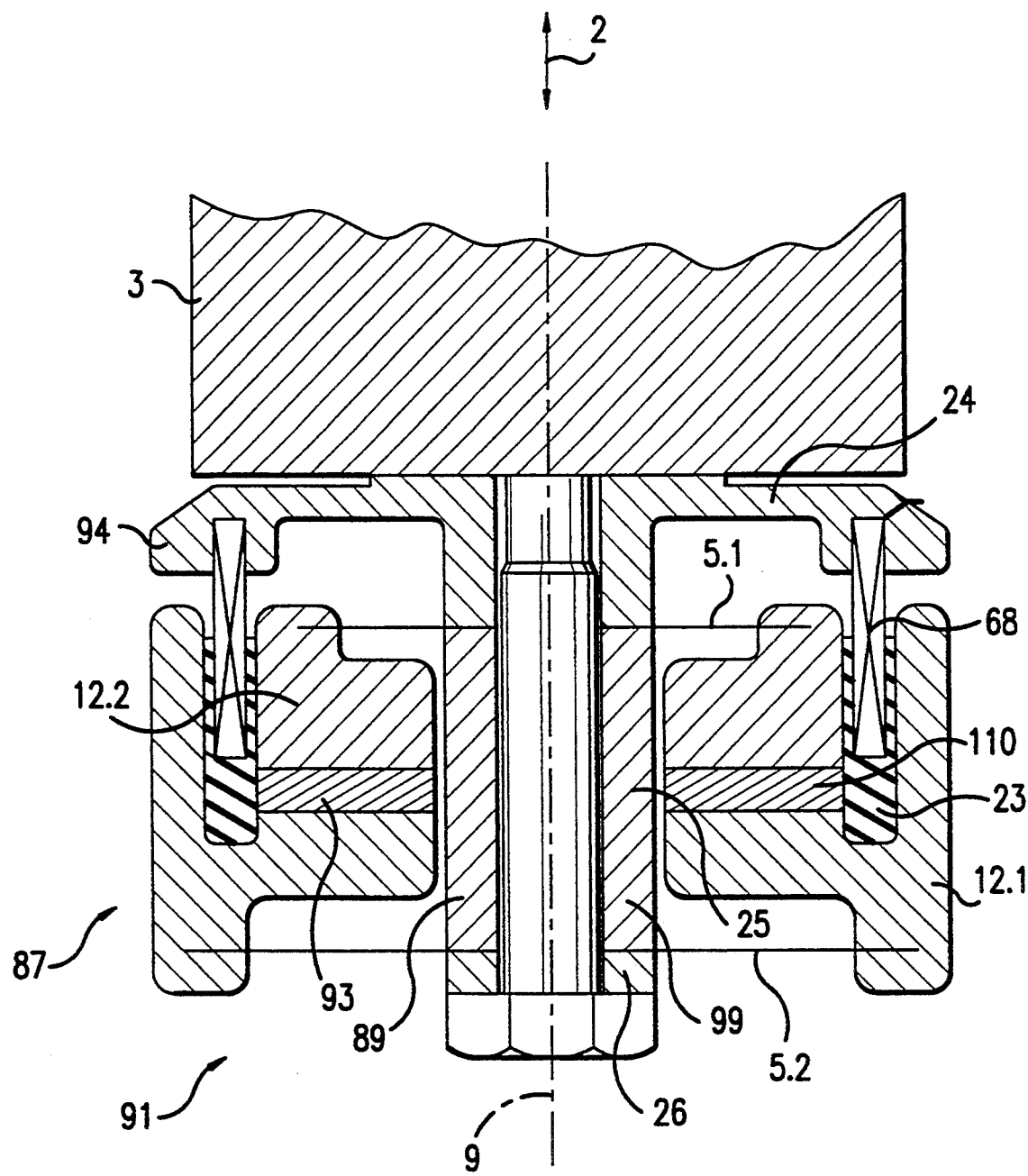
FIG. 5 shows a fifth exemplary embodiment in which the spring element is designed as two metal membranes and the magnet as an axially magnetized disk, and the magnet gap is filled with fluid.

FIG. 5 shows a fifth exemplary embodiment comprising vibration damper 91 wherein cup-shaped magnet 87 consists of a magnet 110 and a magnet housing and support plate 94 forming guideway 89. Magnet 110 is configured as a permanent magnet 93 magnetized in the axial direction, and the magnet housing consists of two magnet elements 12.1, 12.2. The disk-shaped permanent magnet can be produced at a particularly low cost.

In this exemplary embodiment the spring element consists of two metal membranes 5.1, 5.2. Metal membranes 5.1, 5.2 are each attached to one of magnet elements 12.1, 12.2, and clamped in a projection 99 that is divided into multiple parts 24, 25, 26 in the axial direction. The advantage of using the two metal membranes 5.1, 5.2 is that any radial loads which may occur during operation are intercepted by these membranes. Metal membranes 5.1, 5.2 result in particularly good, friction-free radial support and axial guidance, so that additional sliding surfaces between cup-shaped magnet 87 and projection 99 are not necessary.

To enhance damping, the gaps in the cup-shaped magnets 87 can be filled with a viscous medium 23 so that viscous damping results when relative motion occurs between plunger coil 68 and cup-shaped magnet 87.

What is claimed is:

1. An active vibration damper for a reciprocating machine part, comprising:

an inertial mass that can be displaced in the direction of the reciprocating motion, and a support plate that can be fastened to the machine part, wherein the inertial mass and the support plate are connected to one another by a spring element, wherein the inertial mass and the spring element form a vibrating system wherein the natural frequency of the vibrating system is no greater than the frequency of the reciprocating machine part, wherein the inertial mass can be moved by a plunger coil fastened to the support plate, wherein the spring element can be deformed by the plunger coil, wherein the inertial mass comprises a cup-shaped magnet that at least partly concentrically surrounds the plunger coil radially on the inside and outside, and wherein the cup-shaped magnet is guided by a guideway parallel to an axis of the plunger coil.

2. A vibration damper according to claim 1, wherein the spring element comprises an elastomeric material.

3. A vibration damper according to claim 1, wherein the spring element comprises an air cushion that is enclosed by the support plate and the cup-shaped magnet.

4. A vibration damper according to claim 3, wherein the cup-shaped magnet and the support plate are sealed with respect to each other.

5. A vibration damper according to claim 1, wherein the cup-shaped magnet comprises a magnet and a magnet housing, and wherein the magnet is fastened in the magnet housing so as to be immobile with respect thereto.

6. A vibration damper according to claim 5, wherein the magnet is configured as a permanently magnetized annular magnet, and wherein the annular magnet is magnetized in the radial direction.

7. A vibration damper according to claim 5, wherein the magnet comprises a permanent magnet magnetized in the axial direction, and wherein the magnet housing comprises two magnet elements that are associated with the permanent magnet adjacently on either side in the direction of motion of the reciprocating machine part.

8. A vibration damper according to claim 7, wherein the magnet elements are each connected in an elastically flexible manner by means of the spring element, which is made of a metallic material to a cylindrical projection of the support plate extending axially.

9. A vibration damper according to claim 8, wherein the cylindrical projection is configured as a guide sleeve and wherein the magnet elements are supported on the guide sleeve so as to move relative thereto.

10. A vibration damper according to claim 5, wherein the magnet is configured as an electromagnet.

11. A vibration damper according to claim 1, wherein the cup-shaped magnet is annular and enclosed.

12. A vibration damper according to claim 1, wherein the cup-shaped magnet comprises segments distributed circumferentially.

13. A vibration damper according to claim 1, wherein the guideway is arranged so as not to move with respect to the support plate and makes contact with a magnet housing through sliding surfaces.

14. A vibration damper according to claim 13, wherein the guideway comprises at least two guide pins distributed circumferentially, which are surrounded by hollow cylindrical recesses in the magnet housing that extend parallel to the axis of the plunger coil.

15. A vibration damper according to claim 13, wherein at least one of the parts comprising the guideway is provided with a friction-reducing surface coating.

16. A vibration damper according to claim 15, wherein the spring element is configured as a guidance and damping bushing and is arranged in the radial direction between the magnet housing and an axially extending hollow cylindrical projection of the support plate.

17. A vibration damper according to claim 1, wherein in the region that surrounds the plunger coil, the cup-shaped magnet is filled with a viscous medium and wherein the medium is retained in a sealed manner inside the cup-shaped magnet.

* * * * *